US012614834B2

(12) United States Patent
Lu et al.

(10) Patent No.: US 12,614,834 B2
(45) Date of Patent: Apr. 28, 2026

(54) ANTENNA STRUCTURE AND ELECTRONIC DEVICE

(71) Applicant: JRD COMMUNICATION (SHENZHEN) LTD., Shenzhen (CN)

(72) Inventors: Zhengkun Lu, Shenzhen (CN); Xinrong An, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 391 days.

(21) Appl. No.: 18/255,505

(22) PCT Filed: Dec. 14, 2020

(86) PCT No.: PCT/CN2020/136013
§ 371 (c)(1),
(2) Date: Jun. 1, 2023

(87) PCT Pub. No.: WO2022/116258
PCT Pub. Date: Jun. 9, 2022

(65) Prior Publication Data

US 2024/0030588 A1 Jan. 25, 2024

(30) Foreign Application Priority Data

Dec. 2, 2020 (CN) ........................ 202011386269.X

(51) Int. Cl.
*H01Q 1/24* (2006.01)
*H01Q 7/00* (2006.01)
*H01Q 21/28* (2006.01)

(52) U.S. Cl.
CPC ............. *H01Q 1/243* (2013.01); *H01Q 7/005* (2013.01); *H01Q 21/28* (2013.01)

(58) Field of Classification Search
CPC ......... H01Q 1/243; H01Q 7/005; H01Q 21/28
See application file for complete search history.

(56) References Cited

FOREIGN PATENT DOCUMENTS

| | | | |
|---|---|---|---|
| CN | 104134864 | A | 11/2014 |
| CN | 105932402 | A | 9/2016 |
| CN | 206259491 | U | 6/2017 |
| CN | 107071116 | A | 8/2017 |
| CN | 108306117 | A | 7/2018 |
| CN | 108683781 | A | 10/2018 |
| CN | 108923119 | A | 11/2018 |

(Continued)

OTHER PUBLICATIONS

International Search Report in International application No. PCT/CN2020/136013,mailed on Aug. 26, 2021.

(Continued)

*Primary Examiner* — Graham P Smith
(74) *Attorney, Agent, or Firm* — PV IP PC; Wei Te Chung

(57) ABSTRACT

An antenna structure includes a middle frame body. The middle frame body includes a main board and an embedded metal, the embedded metal includes a metal body part and a metal extension part, the metal main body part and the metal extension part are an integral structure, the main board includes a first main board and a second main board, the first main board is electrically connected to the metal extension part, the first main board is configured to introduce a radio frequency signal into the metal extension part, the second main board is electrically connected to the metal extension part, and the second main board is configured to ground the metal extension part.

19 Claims, 7 Drawing Sheets

(56) References Cited

FOREIGN PATENT DOCUMENTS

| | | | |
|---|---|---|---|
| CN | 111883930 | A | 11/2020 |
| CN | 111987454 | A | 11/2020 |
| TW | 201328019 | A | 7/2013 |
| WO | 2017107289 | A1 | 6/2017 |
| WO | 2020140168 | A1 | 7/2020 |

OTHER PUBLICATIONS

Written Opinion of the International Search Authority in International application No. PCT/CN2020/136013,mailed on Aug. 26, 2021.

Notification to Grant Patent Right for Invention issued in corresponding Chinese Patent Application No. 202011386269.X dated Jun. 27, 2022, pp. 1-4.

Chinese Office Action issued in corresponding Chinese Patent Application No. 202011386269.X dated Aug. 18, 2021, pp. 1-8.

ANTENNA STRUCTURE AND ELECTRONIC DEVICE

CROSS REFERENCE TO RELATED APPLICATIONS

This application is a US national phase application based upon an International Application No. PCT/CN2020/136013, filed on Dec. 14, 2020, which claims priority to Chinese Patent Application No. 202011386269.X, filed on Dec. 2, 2020, and entitled "ANTENNA STRUCTURE AND ELECTRONIC DEVICE". The entire disclosures of the above application are incorporated herein by reference.

TECHNICAL FIELD

Embodiments of the present invention relate to the technical field of electronic device, and in particular, to an antenna structure and electronic device.

BACKGROUND

With the continuous development of communication technology, a large number of electronic devices such as smart phones, tablet computers, and notebook computers are widely used. The electronic devices are developing towards diversification and individualization and have increasingly become indispensable electronic devices in people's life and work. Nowadays, the electronic devices such as mobile phones and tablet computers have become electronic devices that people carry with them every day.

Currently, with the popularization of 5G technology and the wide application of carrier aggregation (CA) technology in electronic devices, this results in an increasing number of antennas for electronic devices and supports more and more communication modes and frequency bands. Referring to FIG. 1, in current antenna designs, antenna design areas are usually set on a top area of the electronic device and a bottom area of the electronic device. During the research and practice of the prior art, inventors of embodiments of the present invention found that, with the increase of antennas, the problem faced by major mobile phone manufacturers is that the space and headroom left for antennas are getting smaller and smaller. How to configure multiple antennas while merging multiple antennas to work normally has become a problem that needs to be solved urgently. In the early stage of the electronic device manufacturing project, how to effectively layout multiple antennas is the key to determining the performance of 5G electronic device.

SUMMARY OF INVENTION

Technical Problem

Embodiments of the present invention provide an antenna structure and an electronic device, so as to solve the current urgent problem of how to configure multiple antennas while merging multiple antennas to work normally.

Problem Solution

Technical Solution

Embodiments of the present invention provide an antenna structure and an electronic device. By arranging the antenna structure provided by the embodiments of the present invention, the space for configuring a low frequency antenna in the electronic device can be saved, and more setting areas can be provided for other antennas.

In a first aspect, an embodiment of the present invention provides an antenna structure, the antenna structure comprises a middle frame body, the middle frame body comprises a main board and an embedded metal, the embedded metal comprises a metal body part and a metal extension part, the metal main body part and the metal extension part are an integral structure, the main board comprises a first main board and a second main board, the first main board is electrically connected to the metal extension part, the first main board is configured to introduce a radio frequency signal into the metal extension part, the second main board is electrically connected to the metal extension part, and the second main board is configured to ground the metal extension part.

In the antenna structure, the metal extension part is located on a long side of the middle frame body.

In the antenna structure, the metal extension part is electrically connected to the first main board through a first metal elastic piece, and the metal extension part is electrically connected to the second main board through a second metal elastic piece.

In the antenna structure, the first main board comprises a radio frequency circuit, and the metal extension part is electrically connected to a signal receiving and transmitting end of the radio frequency circuit through the first metal elastic piece.

In the antenna structure, the second main board is provided with an antenna tuner configured to adjust a resonance of the metal extension part.

In the antenna structure, the middle frame body further comprises a metal frame, the metal frame surrounds a subsection of the middle frame body, a gap is formed between the metal extension part and the metal frame, and a numerical range of the gap ranges from 4 mm to 5 mm.

In the antenna structure, the metal extension part ranges from 47.5 mm to 48.5 mm.

In the antenna structure, a numerical range of a gap between a side of the metal extension part close to the embedded metal and the embedded metal ranges from 3.2 mm to 3.4 mm.

In the antenna structure, the metal extension part comprises a first metal extension part and a second metal extension part, and the first metal extension part and the second metal extension part are respectively symmetrically distributed on two long sides of the middle frame body.

In the antenna structure, a number of the metal extension part is multiple, and the metal extension part is located on any side of the embedded metal.

In the antenna structure, the metal extension part is a body of the antenna, and the antenna is a loop antenna.

In the antenna structure, the main body comprises a metal frame, a gap is formed between the metal extension part and the metal frame, and a value of the gap is 4.5 mm.

In the antenna structure, a length of the metal extension part is 48 mm.

In the antenna structure, a numerical range of a gap between a side of the metal extension part close to the embedded metal and the embedded metal is 3.3 mm.

In the antenna structure, a resonant wavelength of the antenna is 0.25λ, and the antenna is adjusted by the antenna tuner to achieve a full coverage of a low frequency range (600 MHz to 960 MHz).

In the antenna structure, the metal extension part is formed by mold injection.

In the antenna structure, the main body is provided with an antenna setting area, a number of the antenna setting area is multiple, the antenna setting area comprises a first antenna setting area, a second antenna setting area, a third antenna setting area, a fourth antenna setting area, and a fifth antenna setting area, the first antenna setting area and the second antenna setting area are symmetrically arranged on a top of the main body and a bottom of the main body, respectively, the first antenna setting area and the second antenna setting area are set with a medium and high frequency antenna, the third antenna setting area and the fourth antenna setting area are respectively symmetrically arranged on both sides of the first main board, the fifth antenna setting area is provided with an antenna element composed of the metal main body part, the metal extension part, the first main board, and the second main board electrically connected, and a low frequency antenna is set in the fifth antenna setting area.

In a second aspect, an embodiment of the present invention provides an electronic device, the electronic device comprises a middle frame body, the middle frame body comprises a main board and an embedded metal, the embedded metal comprises a metal body part and a metal extension part, the metal main body part and the metal extension part are an integral structure, the main board comprises a first main board and a second main board, the first main board is electrically connected to the metal extension part, the first main board is configured to introduce a radio frequency signal into the metal extension part, the second main board is electrically connected to the metal extension part, the second main board is configured to ground the metal extension part, and the metal extension part is located on a long side of the middle frame body.

In the electronic device, the metal extension part is electrically connected to the first main board through a first metal elastic piece, the metal extension part is electrically connected to the second main board through a second metal elastic piece, the first main board comprises a radio frequency circuit, the metal extension part is electrically connected to a signal receiving and transmitting end of the radio frequency circuit through the first metal elastic piece, and the second main board is provided with an antenna tuner configured to adjust a resonance of the metal extension part.

In the electronic device, the middle frame body further comprises a metal frame, the metal frame surrounds a subsection of the middle frame body, a gap is formed between the metal extension part and the metal frame, a numerical range of the gap ranges from 4 mm to 5 mm, the metal extension part ranges from 47.5 mm to 48.5 mm, a numerical range of a gap between a side of the metal extension part close to the embedded metal and the embedded metal ranges from 3.2 mm to 3.4 mm.

BENEFICIAL EFFECT OF THE INVENTION

Beneficial Effect

The beneficial effects of the present application include that: By providing an antenna structure and electronic equipment and combining the common embedded metal of 5G mobile phones, the metal extension part of the embedded metal is used as an antenna. A non-traditional low frequency primary antenna design is proposed. The antenna structure provided by the embodiment of the present invention can realize broadband coverage in the low frequency (600 MHz~960 MHz) communication frequency band. The antenna efficiency is −5 dB~−8 dB, and it occupies a small space, effectively striving for better antenna space for other antennas. While ensuring the free space performance, it can also greatly reduce the attenuation of antenna performance on the head-hand test model, which meets the antenna performance requirements of communication operators.

BRIEF DESCRIPTION OF THE DRAWINGS

Description of Drawings

Figure 1:
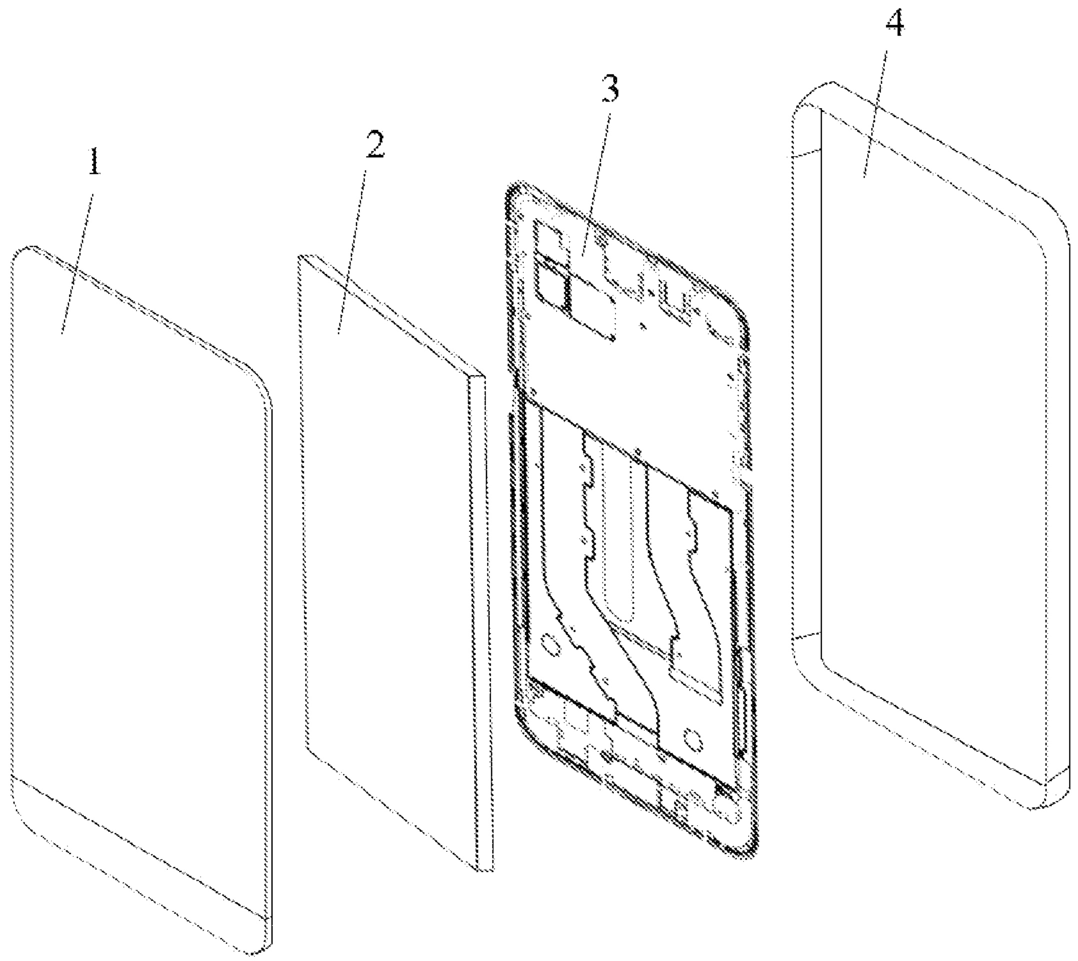

FIG. 1 is an exploded schematic diagram of an electronic device provided by an embodiment of the present invention.

Figure 2:
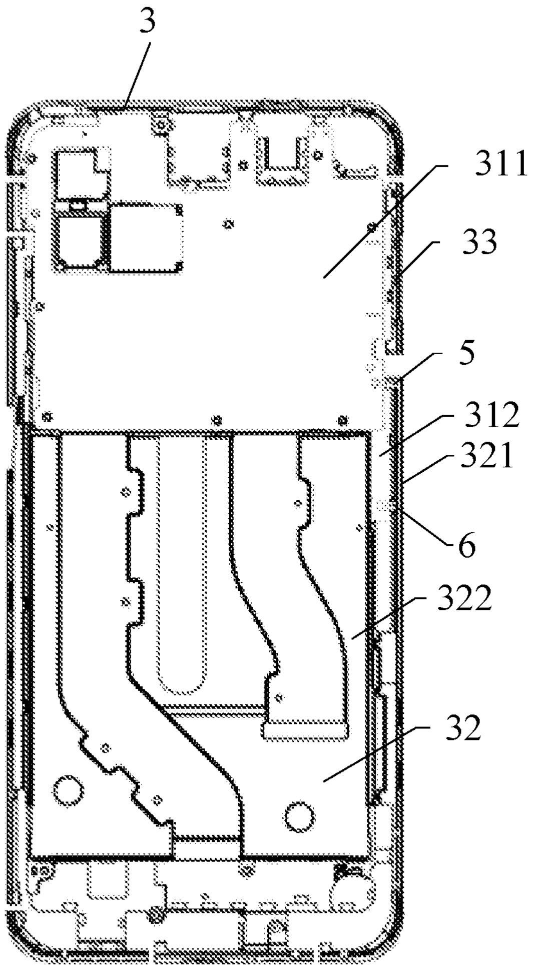

FIG. 2 is a schematic diagram of a first structure of an antenna structure provided by an embodiment of the present invention.

Figure 3:
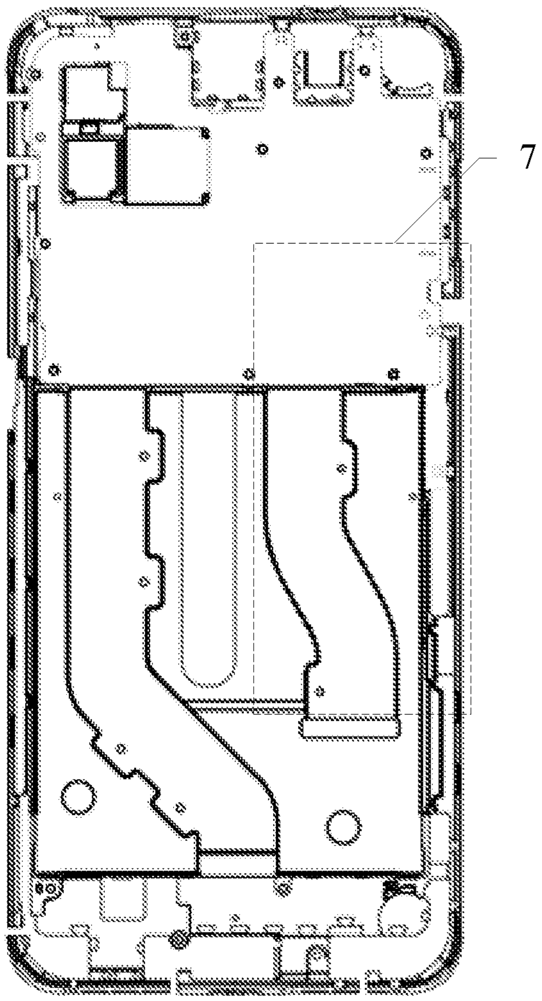

FIG. 3 is a schematic diagram of a second structure of an antenna structure provided by an embodiment of the present invention.

Figure 4:
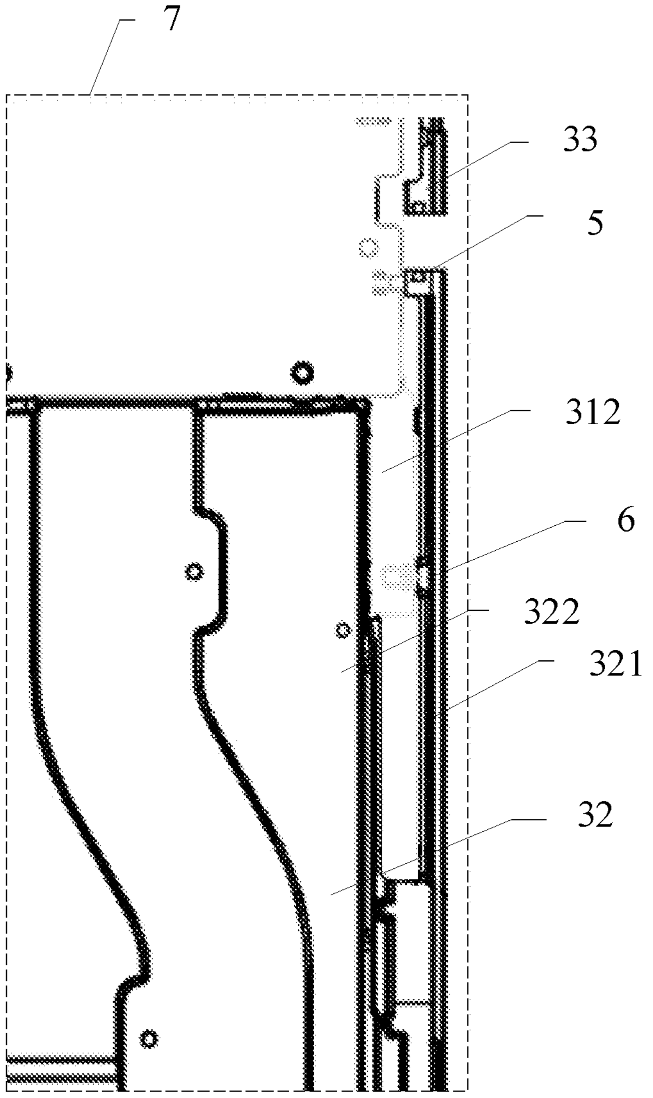

FIG. 4 is a schematic diagram of a first partial structure of an antenna structure provided by an embodiment of the present invention.

Figure 5:
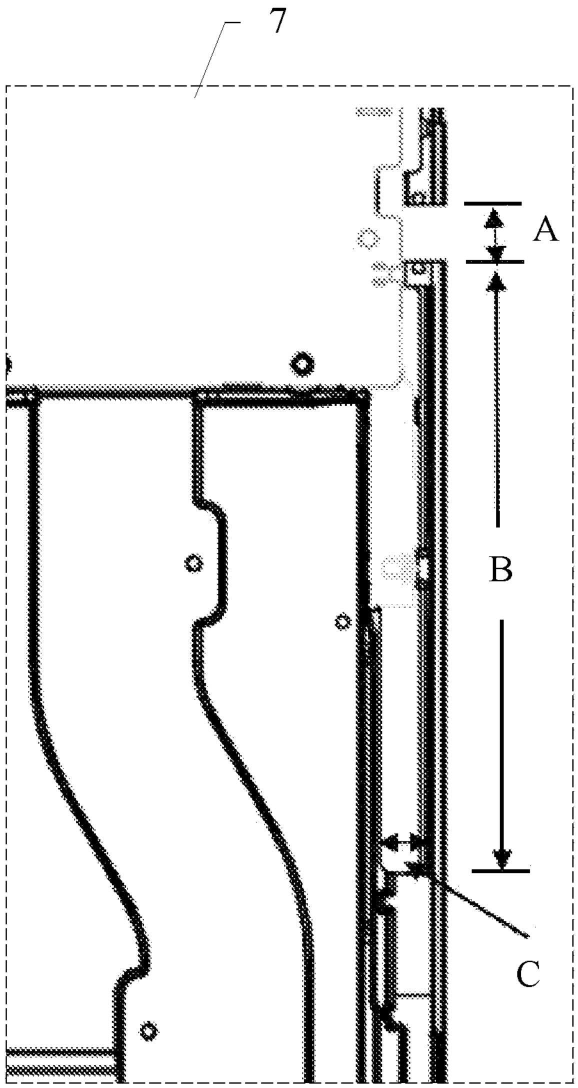

FIG. 5 is a schematic diagram of a second partial structure of the antenna structure provided by the embodiment of the present invention.

Figure 6:
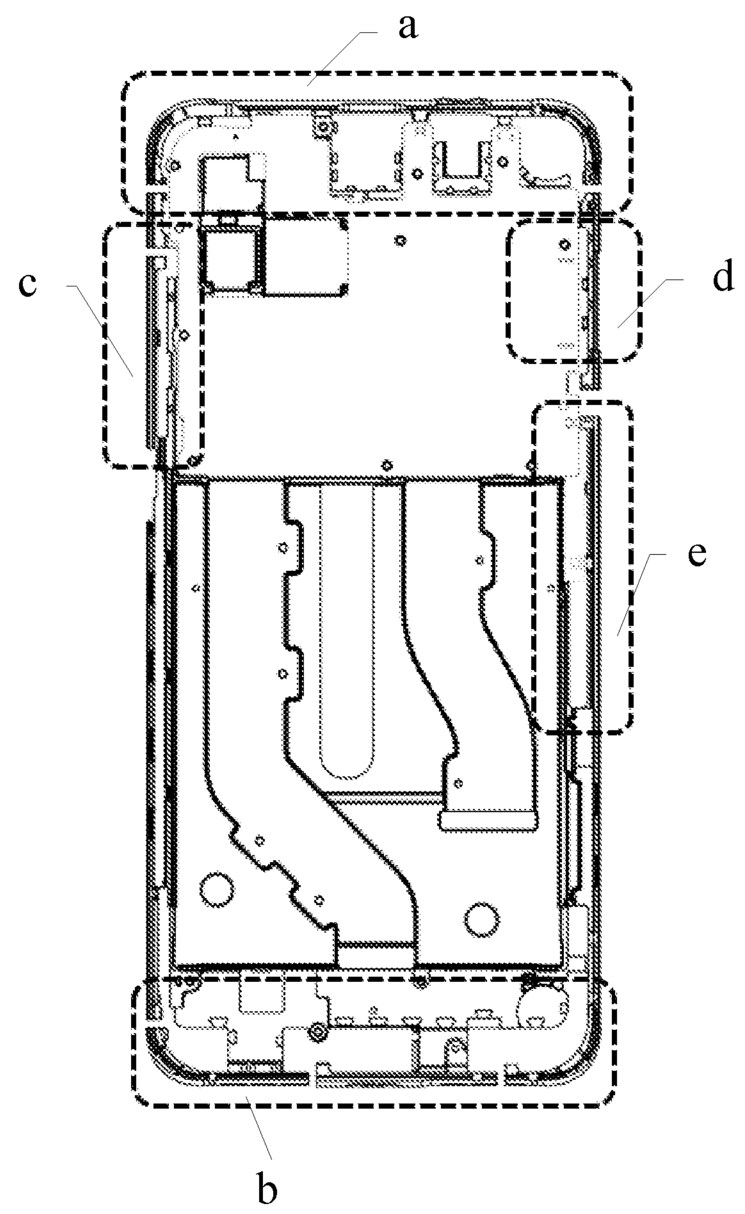

FIG. 6 is a schematic diagram of a third structure of an antenna structure provided by an embodiment of the present invention.

Figure 7:
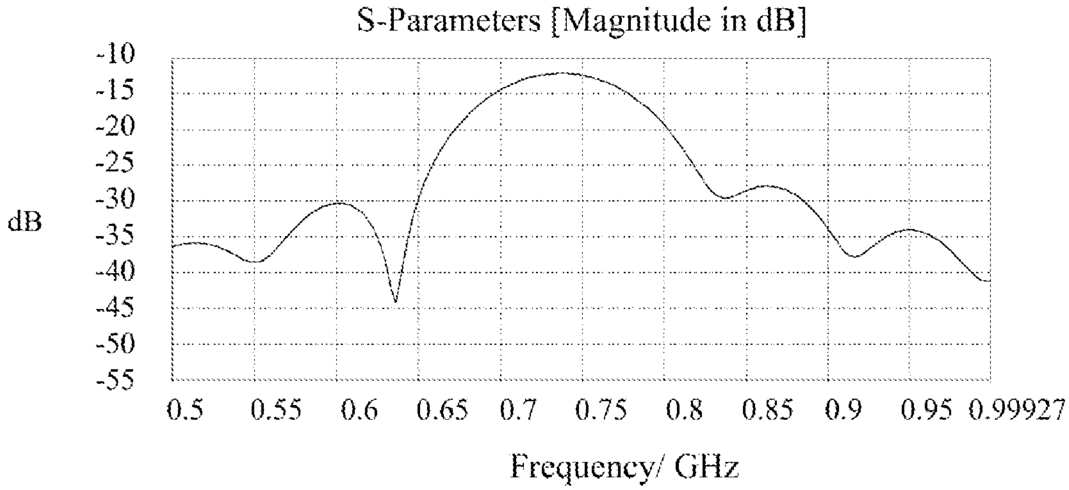

FIG. 7 is a schematic diagram of an isolation simulation result of a traditional antenna structure provided by an embodiment of the present invention.

Figure 8:
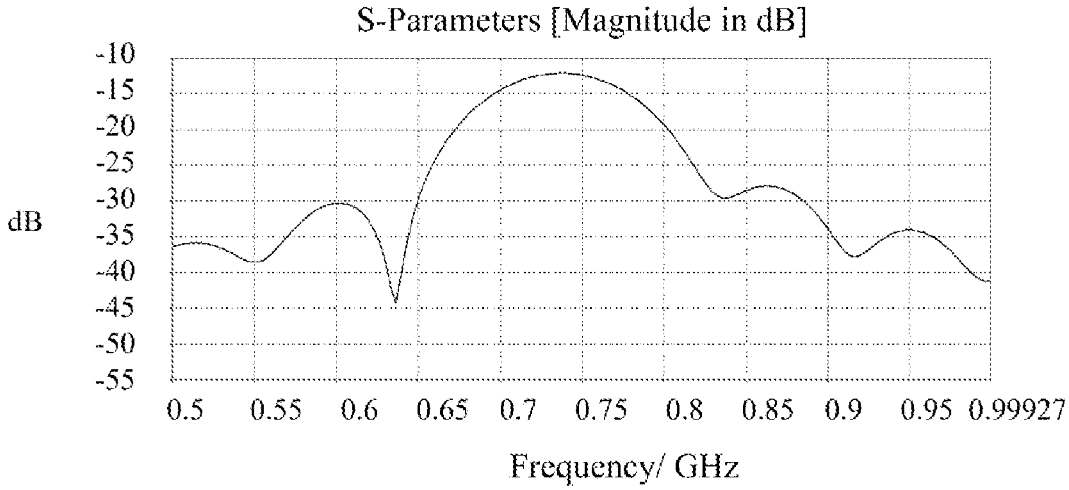

FIG. 8 is a schematic diagram of an isolation simulation result of an antenna structure provided by an embodiment of the present invention.

DETAILED DESCRIPTION OF THE PREFERRED EMBODIMENTS

Embodiments of the Present Invention

The following will clearly and completely describe the technical solutions in the embodiments of the present invention with reference to the drawings in the embodiments of the present invention. Apparently, the described embodiments are only some of the embodiments of the present invention, but not all of them. Based on the embodiments of the present invention, all other embodiments obtained by those skilled in the art without creative efforts fall within the protection scope of the present invention.

In the description of the present invention, it should be understood that the terms “first” and “second” are used for description purposes only and cannot be interpreted as indicating or implying relative importance or implicitly indicating the quantity of indicated technical features. Thus, features defined as “first” and “second” may explicitly or implicitly include one or more of said features. In the description of the present invention, “ ” means two or more than two, unless otherwise specifically defined.

In the description of the present invention, it should be noted that unless otherwise specified and limited, the terms “installation”, “link” and “connection” should be interpreted in a broad sense. For example, it may be a fixed connection, a detachable connection, or an integral connection; it may be a mechanical connection, or an electrical connection, or may communicate with each other. It can be directly connected or indirectly connected through an intermediary, and it can be the internal communication of two elements or the interaction relationship between two elements. Those of ordinary skill in the art can understand the specific meanings of the above terms in the present invention according to specific situations.

The following disclosure provides many different embodiments or examples for implementing different structures of the present invention. To simplify the disclosure of the present invention, components and arrangements of specific examples are described below. It is understood that, they are only examples and are not intended to limit the invention. Furthermore, the present disclosure may repeat reference numerals and/or reference letters in different instances, such repetition is for simplicity and clarity and does not in itself indicate a relationship between the various embodiments and/or arrangements discussed. In addition, various specific process and material examples are provided herein, but one of ordinary skill in the art may recognize the use of other processes and/or the use of other materials. In the foregoing embodiments, the descriptions of each embodiment have their own emphases, and for parts not described in detail in a certain embodiment, reference may be made to relevant descriptions of other embodiments.

Embodiments of the present invention provide an antenna structure and electronic device. The antenna structure can be used with electronic devices, such as smart phones, tablet computers, notebook computers or personal computers. The antenna structure will be described in detail below. It should be noted that the description sequence of the following embodiments is not intended to limit the preferred sequence of the embodiments.

It should be noted that, in the embodiment of the present invention, a long side refers to a relatively long side of an electronic device (such as a mobile phone).

The present invention will be described in detail below with reference to the accompanying drawings and specific embodiments, as illustrated in FIG. 1 to FIG. 8.

Refer to FIG. 1, FIG. 1 shows an exploded view of an electronic device 10 provided according to an embodiment of the present invention. The electronic device including a display screen 2 such as a mobile phone, a tablet PC, a notebook PC, and a PDA can also be used as an embodiment.

Referring to FIG. 1, an electronic device 10 according to an exemplary embodiment may include a cover plate 1, a display screen 2, a middle frame body 3, and a rear case 4. Further, the electronic device 10 may also include components such as a radio frequency (RF) circuit, a memory including one or more computer-readable storage media, an input unit, a display unit, a sensor, an audio circuit, a wireless fidelity (Wi-Fi) module, a processor including one or more processing cores, a control circuit, a battery, a front camera, a rear camera, and a fingerprint unlocking module antenna structure. It should be noted that the electronic device 10 shown in FIG. 1 is not limited to the above content. The power supply can be arranged between the display screen 2 and the middle frame body 3. The display screen 2 can be electrically connected to a printed circuit board provided on the middle frame body via a flexible printed circuit.

The cover plate 1 is installed on the display screen 2 and arranged in front of the display screen 2 to cover the display screen 2. The cover plate 1 can be a transparent glass cover plate, so that a light-transmitting cover plate 6 of the display screen can display. In some embodiments, the cover plate 11 may be a glass cover plate made of materials such as sapphire. In this embodiment, "front" refers to the direction facing the side of the display screen 2 displaying information, and "rear" refers to the direction opposite to "front".

The display screen 2 is configured to display electronic files on the screen, and the display screen 2 can display information such as images, videos, or texts. The display screen 2 may include a front surface on which information is displayed, and a rear surface on the opposite side of the front surface.

The display screen 2 is installed in the middle frame body 3. The display screen 2 is electrically connected to the control circuit provided on the middle frame body to form the display surface of the electronic device 10. The display screen 2 is in a regular shape, such as a cuboid structure. The top and/or bottom of the electronic device 10 forms a non-display area. That is, the electronic device 10 forms a non-display area on the upper part or/and the lower part of the display screen 2. The electronic device 10 may install devices such as a front camera and a rear camera in the non-display area.

The control circuit is installed in the middle frame body 3. The control circuit may be the main board of the electronic device 10. The control circuit can be integrated with one, two, or more of functional components such as a motor, a microphone, a speaker, a headphone jack, a universal serial bus interface, a front camera, a rear camera, a distance sensor, an ambient light sensor, a receiver, and a processor.

In some embodiments, the control circuit can be fixed in the middle frame body 3. Specifically, the control circuit can be screwed to the middle frame body 3 through screws or can be snap-fitted to the middle frame body 3 in a buckle manner. It should be noted that, the method of fixing the control circuit to the middle frame body 3 in the embodiment of the present invention is not limited to this, and other methods can also be used, such as fixing together by buckles and screws.

In some embodiments, the middle frame body 3 may include a plastic part and a metal part. The middle frame body 3 may be a shell structure in which metal and plastic cooperate with each other. Specifically, the metal part can be formed first, for example, the magnesium alloy substrate is formed by mold injection. Injecting plastic on the magnesium alloy substrate to form a plastic substrate constitutes a complete shell structure. It should be noted that the material and process of the middle frame body 3 are not limited thereto.

In some embodiments, the rear case 4 can be a metal case, such as magnesium alloy, stainless case and other metals. It should be noted that the material of the rear case 4 in the embodiment of the present invention is not limited to this, and other methods can also be used. For example: the rear case 4 can be a plastic case. Another example: the rear case 4 is a ceramic case. A glass case may also be used. The rear case 4 can be arranged behind the middle frame body 3, and the rear case 4 is used for accommodating the middle frame body 7. In this embodiment, "rear" refers to the direction facing away from the side where the power supply is located in the middle frame body, and "rear" refers to the direction opposite to "front".

In some embodiments, the battery can be logically connected to the processor through the power management system, so that functions such as charging, discharging, and power consumption management can be implemented through the power management system. The battery may also include one or more DC or AC power sources, recharging systems, power failure detection circuits, power converters or inverters, power status indicators, and any other components.

The above shows a schematic structural diagram of the electronic device involved in the embodiment of the present invention. The above has been specifically described from the perspective of electronic device composition. The electronic device may be a smart phone, a tablet computer, a notebook computer, or a personal computer. The antenna structure provided by the embodiment of the present invention is described below.

Refer to FIG. 2, FIG. 3, FIG. 4, and FIG. 5 together, an embodiment of the present invention provides an antenna structure, the antenna structure comprises a middle frame body 3, the middle frame body 3 comprises a main board 31 and an embedded metal 32, the embedded metal 32 comprises a metal body part 322 and a metal extension part 321, the metal main body part 322 and the metal extension part 321 are an integral structure, the main board 31 comprises a first main board 311 and a second main board 312, the first main board 311 is electrically connected to the metal extension part 321, the first main board 311 is configured to introduce a radio frequency signal into the metal extension part 321, the second main board 312 is electrically connected to the metal extension part 321, and the second main board 312 is configured to ground the metal extension part 321.

In details, in an embodiment of the present invention, the metal extension part 321 is located on a long side of the middle frame body 3. The metal extension part 321 is electrically connected to the first main board 311 through a first metal elastic piece, and the metal extension part 321 is electrically connected to the second main board 312 through a second metal elastic piece. The first metal piece is set at a first metal piece setting position 5, and the second metal piece is set at a second metal piece setting position 6. The first main board 311 comprises a radio frequency circuit, and the metal extension part 321 is electrically connected to a signal receiving and transmitting end of the radio frequency circuit through the first metal elastic piece. The second main board 312 is provided with an antenna tuner configured to adjust a resonance of the metal extension part 321. The middle frame body 3 further comprises a metal frame 33, and the metal frame 33 surrounds a subsection of the middle frame body 3.

In details, a gap A is formed between the metal extension part 321 and the metal frame 33, and a numerical range of the gap A ranges from 4 mm to 5 mm. The metal extension part 321 ranges from 47.5 mm to 48.5 mm. A numerical range of a gap C between a side of the metal extension part 321 close to the embedded metal 32 and the embedded metal 32 ranges from 3.2 mm to 3.4 mm.

In some embodiments, the metal extension part 321 is a body of an antenna body, and the antenna is a loop antenna.

In some embodiments, the long side is not provided with any buttons.

In some embodiments, the main body comprises a metal frame 33, a gap A is formed between the metal extension part 321 and the metal frame 33, and a value of the gap A is 4.5 mm. A length B of the metal extension part 321 is 48 mm. A numerical range of a gap C between a side of the metal extension part 321 close to the embedded metal 32 and the embedded metal 32 is 3.3 mm.

In details, in an embodiment of the present invention, a resonant wavelength of the antenna is 0.25λ, and the antenna is adjusted by the antenna tuner to achieve a full coverage of a low frequency range (600 MHz to 960 MHz).

In details, in an embodiment of the present invention, the metal extension part 321 is formed by mold injection.

It should be noted that the second main board is a small tuner board. The small tuner board is connected to the metal extension part through the second metal piece. The other end of the tuner board and the embedded metal have a conduction structure design. The small tuner board communicates with the embedded metal, that is, the small tuner board is equal to a ground. Antenna tuners have various working states. For example: 1) The antenna tuner makes the tuner board open. That is, the tuner board is not grounded. At this time, the state of the metal extension part, that is, the antenna, is that the feed is directly connected to the ground at the end of the frame, resulting in a resonance of 600~700 MHz. 2) The antenna tuner makes the tuner board in a conduction state. Then, through the matching circuit reserved by the circuit around the antenna tuner, try various matches (conventional use capacitors, inductors and 0 ohm resistors to debug different matches). That is, the state of the antenna at this time is mainly that the signal is input from the feeder and transmitted to the second metal piece through the metal extension part. After that, pass the second metal case to the antenna tuner. Finally, a loop is formed through the matching circuit to the ground to generate resonance. This resonance is tuned by matching on the circuit (i.e., routinely using caps, inductance and 0 ohm resistors). Finally, resonance can be generated at 700~800 MHz, or at 800~900 MHz or 900~960 MHz. Adjust the resonance through the tuner (antenna tuner, commonly known as the antenna switch) on the tuner board to achieve full coverage of the low frequency band (600~960 MHz).

Specifically, in the embodiment of the present invention, the metal main body part 322 and the metal extension part 321 are an integrated structure. In the embodiment of the present invention, the entire embedded metal 32 is equivalent to the whole ground. The end of the metal extension part 321 is connected to the metal main body part 322, that is, it is grounded. The upper end of the metal extension part 321 is connected to a signal input point through the first metal piece to form a power feed. The end of the metal extension part 321 is connected to the metal main body part 322 to form a ground, thus forming an antenna structure: a loop antenna.

It should be noted that the embedded metal 32 is wrapped by an in-molded plastic material. The surface of the metal extension part 321 is fully covered by plastic material through an in-mold injection molding process. There is only exposed metal where it meets the metal piece. That is, the metal is exposed at the place where the metal extension part 321 meets the first metal piece. Metal is exposed where the metal extension part 321 meets the second metal piece. Furthermore, laser engraving and gold spot welding processes are added only where the metal piece is in contact with, so as to enhance the conductivity between the metal piece and the metal extension part 321.

Refer to FIG. 6, specifically, in this embodiment of the present invention, the main body is provided with an antenna setting area, a number of the antenna setting area is multiple, the antenna setting area comprises a first antenna setting area a, a second antenna setting area b, a third antenna setting area c, a fourth antenna setting area d, and a fifth antenna setting area e, the first antenna setting area a and the second antenna setting area b are symmetrically arranged on a top of the main body and a bottom of the main body, respectively, the first antenna setting area a and the second antenna setting area b are set with a medium and high frequency antenna, the third antenna setting area c and the fourth antenna setting area d are respectively symmetrically arranged on both sides of the first main board 311, the fifth antenna setting area e is provided with an antenna element composed of the metal main body part 322, the metal extension part 321, the first main board 311, and the second main board 312 electrically connected, and a low frequency antenna is set in the fifth antenna setting area e.

In some embodiments, the metal extension part comprises a first metal extension part and a second metal extension part, and the first metal extension part and the second metal extension part are respectively symmetrically distributed on two long sides of the middle frame body 3.

In some embodiments, a number of the metal extension part is multiple, and the metal extension part is located on any side of the embedded metal.

Refer to FIG. 7 and FIG. 8 together, there are two traditional low-frequency antennas in the mobile phone antenna industry: the main antenna and the diversity antenna. Generally speaking, the traditional low-frequency antenna design scheme will place the main antenna and the diversity antenna on the top of the mobile phone and one on the bottom. Generally speaking, the greater the distance between two antennas, the better the isolation will be. Based on this, the antenna simulation software CST is used to simulate the isolation of the traditional low-frequency antenna design scheme and the antenna structure provided by the embodiment of the present invention. The isolation simulation result of the traditional low-frequency antenna design scheme is shown in FIG. 7, and the isolation simulation result of the antenna structure provided by the embodiment of the present invention is shown in FIG. 8. It can be concluded that the low-frequency main antenna in the embodiment of the present invention is located on the side of the middle body (i.e., the battery) of the middle frame. Compared with the traditional low-frequency antenna design scheme, it can ensure that the isolation between the two is basically the same. Under the condition that the isolation degree remains unchanged, adopting the antenna structure provided by the embodiment of the present invention can effectively reserve more space for installing the antenna on the electronic device.

To sum up, the embodiments of the present invention provide an antenna structure and an electronic device. The antenna structure provided by the embodiment of the present invention is combined with the common embedded metal of the 5G mobile phone, and the metal extension part embedded with the metal is used as the antenna. A non-traditional low-frequency primary antenna design is proposed. The antenna structure provided by the embodiment of the present invention can realize broadband coverage in the low-frequency (600 MHz~960 MHz) communication frequency band. The antenna efficiency is −5 dB~−8 dB, and it occupies a small space, effectively striving for better antenna space for other antennas. While ensuring the free space performance, it can also greatly reduce the attenuation of antenna performance on the head-hand test model, which meets the antenna performance requirements of communication operators.

In the foregoing embodiments, the descriptions of each embodiment have their own emphases. For parts not described in detail in a certain embodiment, reference may be made to relevant descriptions of other embodiments. The embodiments described above are only some of the embodiments of the present invention, but not all of them. Based on the embodiments of the present invention, those skilled in the art can obtain all other embodiments without making creative efforts. As mentioned in the embodiment of the present invention, the metal extension part embedded with metal can be used as the antenna main body (low-frequency antenna), all of which belong to the protection scope of the present invention.

The antenna structure and the electronic device provided by the embodiments of the present invention have been introduced in detail above. In the embodiments of the present invention, specific examples are used to illustrate the principles and implementation modes of the present invention. The descriptions of the above embodiments are only used to help understand the method and core idea of the present invention. In addition, for those skilled in the art, according to the idea of the present invention, there will be changes in the specific implementation and application range. In summary, the contents of this specification should not be construed as limiting the present invention.

What is claimed is:

1. An antenna structure, comprising:

a middle frame body, wherein the middle frame body comprises a main board and an embedded metal, the embedded metal comprises a metal body part and at least one metal extension part, the metal body part and the at least one metal extension part are an integral structure, the main board comprises a first main board and a second main board, the first main board is electrically connected to the at least one metal extension part, the first main board is configured to introduce a radio frequency signal into the at least one metal extension part, the second main board is electrically connected to the at least one metal extension part, and the second main board is configured to ground the at least one metal extension part;

wherein a numerical range of a gap between a side of the at least one metal extension part close to the embedded metal and the embedded metal ranges from 3.2 mm to 3.4 mm.

2. The antenna structure of claim 1, wherein the at least one metal extension part is located on a long side of the middle frame body.

3. The antenna structure of claim 2, further comprising a first metal elastic piece and a second metal elastic piece, wherein the at least one metal extension part is electrically connected to the first main board through the first metal elastic piece, and the at least one metal extension part is electrically connected to the second main board through the second metal elastic piece.

4. The antenna structure of claim 3, wherein the first main board comprises a radio frequency circuit, and the at least one metal extension part is electrically connected to a signal receiving and transmitting end of the radio frequency circuit through the first metal elastic piece.

5. The antenna structure of claim 4, wherein the second main board comprises an antenna tuner configured to adjust a resonance of the at least one metal extension part.

6. The antenna structure of claim 1, wherein the middle frame body further comprises a metal frame, the metal frame surrounds a subsection of the middle frame body, a gap is formed between the at least one metal extension part and the metal frame, and a numerical range of the gap ranges from 4 mm to 5 mm.

7. The antenna structure of claim 1, wherein the at least one metal extension part ranges from 47.5 mm to 48.5 mm.

8. The antenna structure of claim 1, wherein the at least one metal extension part comprises a first metal extension part and a second metal extension part, and the first metal extension part and the second metal extension part are respectively symmetrically distributed on two long sides of the middle frame body.

9. The antenna structure of claim 1, wherein the at least one metal extension part is located on any side of the embedded metal.

10. The antenna structure of claim 1, wherein the at least one metal extension part is a body of the antenna, and the antenna is a loop antenna.

11. The antenna structure of claim 5, wherein the middle frame body comprises a metal frame, a gap is formed between the at least one metal extension part and the metal frame, and a value of the gap is 4.5 mm.

12. The antenna structure of claim 11, wherein a length of the at least one metal extension part is 48 mm.

13. The antenna structure of claim 12, wherein a numerical range of a gap between a side of the at least one metal extension part close to the embedded metal and the embedded metal is 3.3 mm.

14. The antenna structure of claim 13, wherein a resonant wavelength of the antenna is 0.25λ, and the antenna is adjusted by the antenna tuner to achieve a full coverage of a low frequency range between 600 MHz and 960 MHz.

15. The antenna structure of claim 1, further comprising a medium and high frequency antenna, an antenna element, and a low frequency antenna, wherein the middle frame body is provided with at least one antenna setting area, the at least one antenna setting area comprises a first antenna setting area, a second antenna setting area, a third antenna setting area, a fourth antenna setting area, and a fifth antenna setting area, the first antenna setting area and the second antenna setting area are symmetrically arranged on a top of the middle frame body and a bottom of the middle frame body, respectively, the first antenna setting area and the second antenna setting area are set with the medium and high frequency antenna, the third antenna setting area and the fourth antenna setting area are respectively symmetrically arranged on both sides of the first main board, the fifth antenna setting area is provided with the antenna element, the antenna element is composed of the metal body part, the at least one metal extension part, the first main board, and the second main board electrically connected, and the low frequency antenna is set in the fifth antenna setting area.

16. An electronic device, comprising:

a middle frame body, wherein the middle frame body comprises a main board and an embedded metal, the embedded metal comprises a metal body part and at least one metal extension part, the metal body part and the at least one metal extension part are an integral structure, the main board comprises a first main board and a second main board, the first main board is electrically connected to the at least one metal extension part, the first main board is configured to introduce a radio frequency signal into the at least one metal extension part, the second main board is electrically connected to the at least one metal extension part, the second main board is configured to ground the at least one metal extension part, and the at least one metal extension part is located on a long side of the middle frame body;

wherein the middle frame body further comprises a metal frame, the metal frame surrounds a subsection of the middle frame body, a gap is formed between the at least one metal extension part and the metal frame, a numerical range of the gap ranges from 4 mm to 5 mm, the at least one metal extension part ranges from 47.5 mm to 48.5 mm, a numerical range of a gap between a side of the at least one metal extension part close to the embedded metal and the embedded metal ranges from 3.2 mm to 3.4 mm.

17. The electronic device of claim 16, further comprising a first metal elastic piece and a second metal elastic piece, wherein the at least one metal extension part is electrically connected to the first main board through the first metal elastic piece, and the at least one metal extension part is electrically connected to the second main board through the second metal elastic piece, the first main board comprises a radio frequency circuit, the at least one metal extension part is electrically connected to a signal receiving and transmitting end of the radio frequency circuit through the first metal elastic piece, and the second main board comprises an antenna tuner configured to adjust a resonance of the at least one metal extension part.

18. The electronic device of claim 16, wherein the at least one metal extension part comprises a first metal extension part and a second metal extension part, and the first metal extension part and the second metal extension part are respectively symmetrically distributed on two long sides of the middle frame body.

19. An antenna structure, comprising:

a middle frame body, wherein the middle frame body comprises a main board and an embedded metal, the embedded metal comprises a metal body part and at least one metal extension part, the metal body part and the at least one metal extension part are an integral structure, the main board comprises a first main board and a second main board, the first main board is electrically connected to the at least one metal extension part, the first main board is configured to introduce a radio frequency signal into the at least one metal extension part, the second main board is electrically connected to the at least one metal extension part, and the second main board is configured to ground the at least one metal extension part;

wherein the antenna structure further comprises a medium and high frequency antenna, an antenna element, and a low frequency antenna, wherein the middle frame body is provided with at least one antenna setting area, the at least one antenna setting area comprises a first antenna setting area, a second antenna setting area, a third antenna setting area, a fourth antenna setting area, and a fifth antenna setting area, the first antenna setting area and the second antenna setting area are symmetrically arranged on a top of the middle frame body and a bottom of the middle frame body, respectively, the first antenna setting area and the second antenna setting area are set with the medium and high frequency antenna, the third antenna setting area and the fourth antenna setting area are respectively symmetrically arranged on both sides of the first main board, the fifth antenna setting area is provided with the antenna element, the antenna element is composed of the metal body part, the at least one metal extension part, the first main board, and the second main board electrically connected, and the low frequency antenna is set in the fifth antenna setting area.

* * * * *